United States Patent
Zhao et al.

(10) Patent No.: US 6,733,185 B2
(45) Date of Patent: May 11, 2004

(54) OPTICAL FIBER CONNECTOR ASSEMBLY HAVING FIBER SAVER

(75) Inventors: Jim X. Zhao, Mission Viejo, CA (US); Frank Quach, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/218,044

(22) Filed: Aug. 12, 2002

(65) Prior Publication Data
US 2004/0028341 A1 Feb. 12, 2004

(51) Int. Cl.[7] ................................................. G02B 6/38
(52) U.S. Cl. .......................................................... 385/55
(58) Field of Search ............................. 385/55, 76, 70, 385/84, 85, 135, 139, 138

(56) References Cited
U.S. PATENT DOCUMENTS

| | | | | |
|---|---|---|---|---|
| 4,373,777 A | * | 2/1983 | Borsuk et al. | 385/139 |
| 4,601,536 A | * | 7/1986 | Guazzo | 385/69 |
| 4,863,235 A | * | 9/1989 | Anderson et al. | 385/87 |
| 5,046,811 A | * | 9/1991 | Jung et al. | 385/15 |
| 5,052,775 A | * | 10/1991 | Bossard et al. | 385/76 |
| 5,115,483 A | * | 5/1992 | Morency et al. | 385/60 |
| 5,363,467 A | * | 11/1994 | Keith | 385/135 |
| 5,778,122 A | * | 7/1998 | Giebel et al. | 385/55 |

* cited by examiner

*Primary Examiner*—Tulsidas C. Patel
(74) *Attorney, Agent, or Firm*—Wei Te Chung

(57) ABSTRACT

An optical fiber connector assembly (2) includes am optical isolator (10), an optical connector (17) and a fiber saver (11). The optical isolator is received in an isolator tube (19). The fiber saver comprises a helical block (15), a helical block tube (12), two cone members (13, 14) and an extender (18). Optical fiber (102) is wrapped around the helical block, and the helical block is received in the helical block tube-. The two cone members are mounted at the two ends of the helical block tube to prevent movement of the helical block within the helical block tube. The extender receives the helical block tube therein and connects to the isolator tube and to an a adaptor (16). The adaptor couples to the optical connector.

12 Claims, 3 Drawing Sheets

OPTICAL FIBER CONNECTOR ASSEMBLY HAVING FIBER SAVER

BACKGROUND OF THE INVENTION

1. Field of the Invention

The present invention relates to an optical fiber connector assembly and particularly to an optical fiber connector assembly having a fiber saver for storing an optical fiber.

2. Description of Related Art

Present day telecommunication technology utilizes, to an increasing extent, optical fibers for signal transmission. The use of optical fibers, in turn, requires numerous optical components adapted to handle optical signals, such as optical switches, optical couplers, optical circulators, optical isolators and so on.

A typical optical component has at least one input port and one output port. When the optical component is used in an optical network, the input port and the output port must be connected in an optical path of the optical network. For example, an optical isolator 10 as shown in FIG. 1 has an input fiber 102 and an output fiber 101. Optical signals transmitting through input fiber 102 pass through the optical isolator 10 and then travel through the output fiber 101. To connect this optical isolator 10 to an outer optical network, it is necessary to connect connectors (not shown) in the network to the two ends of the optical isolator 10. However, if any one of the connectors is damaged during assembly, or gives substandard optical performance because of bad polishing or for other reasons, the user will have to disassemble the connector from the optical isolator and reassemble a new optical connector to the optical isolator. But the length of the fiber available attached to the optical isolator will become shorter since some will have been wasted replacing the old connector, so that when the new connector is ready to be assembled to the optical isolator 10, insufficient optical fiber may be available, which finally lead to waste of the isolator 10.

Therefor, an optical fiber connector assembly is desired which can store extra optical fiber to allow a reuse of the optical connector assembly.

SUMMARY OF THE INVENTION

An object of the present invention is to provide an improved optical fiber connector assembly having a fiber saver, which provides for reuse of the optical fiber connector assembly.

An optical fiber connector assembly in accordance with the present invention comprises: an optical isolator, a fiber saver and an optical connector.

The optical isolator is mounted in an isolator tube and has an input fiber. The input and output fibers are individually received in optical connectors to connect the optical isolator in an optical network.

The fiber saver includes a helical block, a helical block tube, a pair of cone members and an extender. The fiber can wrap around the helical block, which is received in the helical block tube. The extender is used to receive the helical block tube and to connect to the isolator tube and to an adaptor, to which the optical connector is coupled.

DETAILED DESCRIPTION OF THE INVENTION

Figure 1:
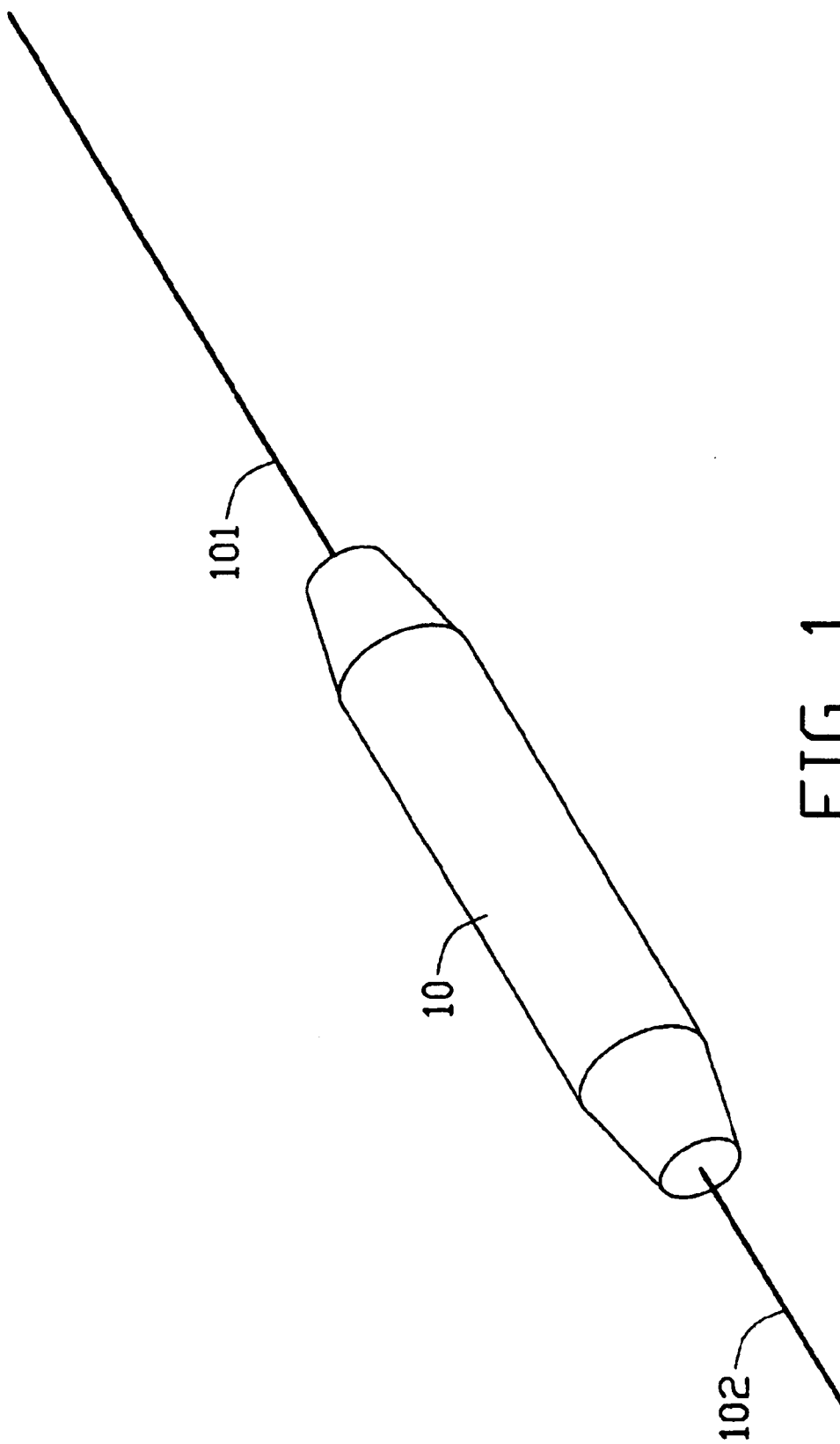
FIG. 1 shows a prior art optical isolator.
Figure 2:
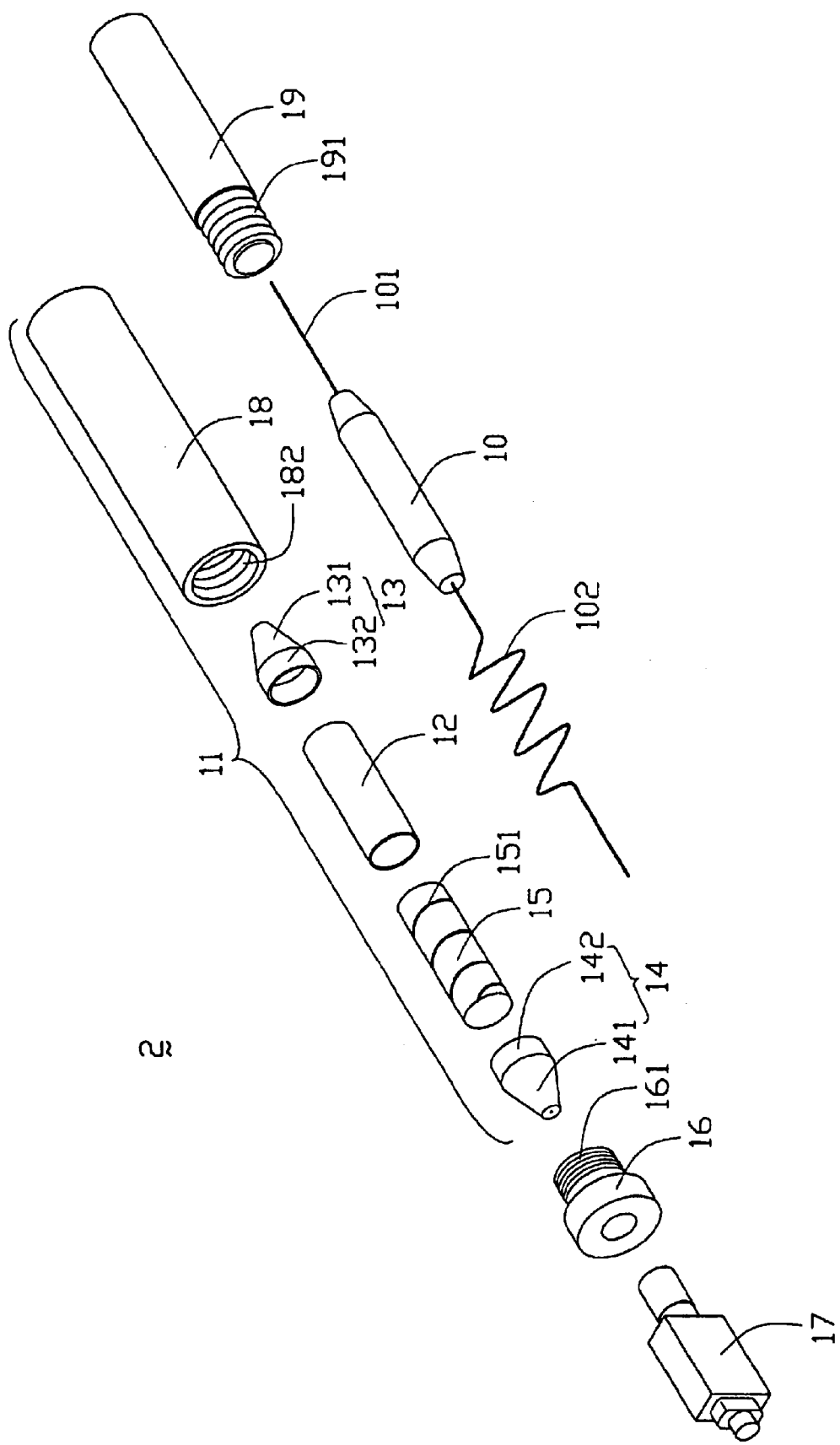
FIG. 2 is an exploded perspective view of an optical fiber connector assembly according to the present invention.
Figure 3:
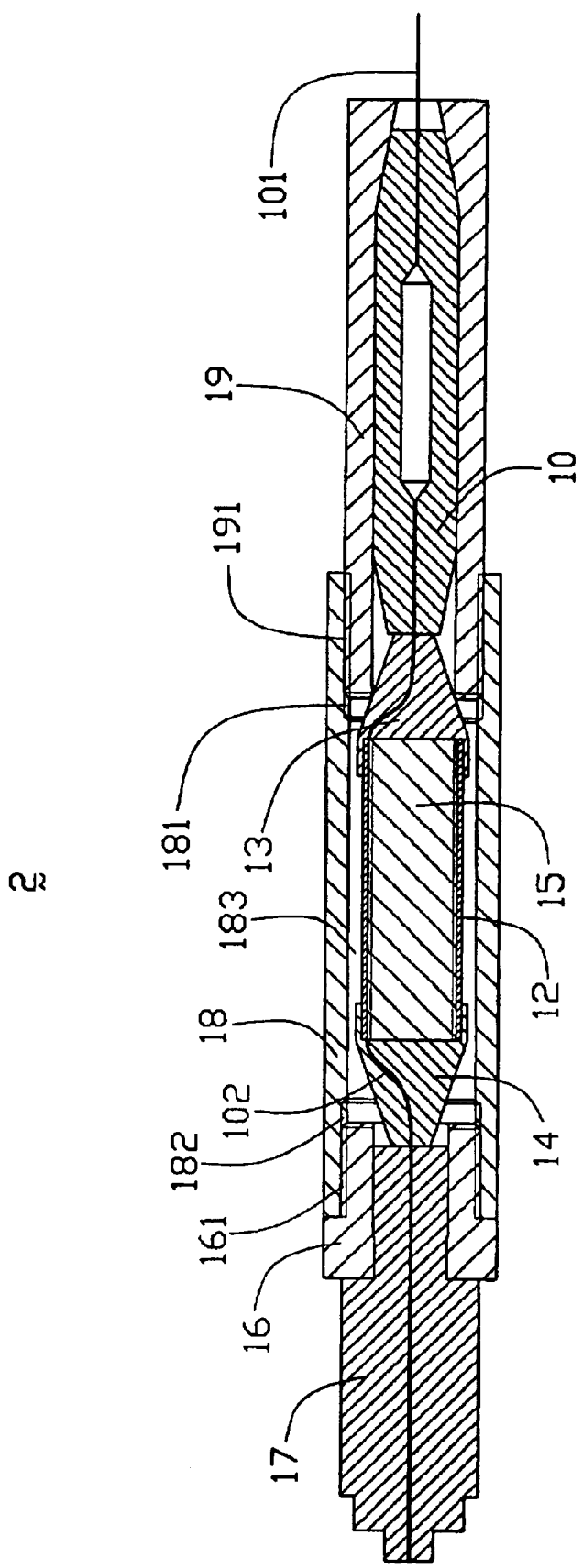
FIG. 3 is a cross-sectional view of the assembled optical fiber connector assembly of FIG. 2.

As shown in FIGS. 2 and 3, an optical fiber connector assembly 2 comprises an optical isolator 10, an optical connector 17 and a fiber saver 11.

The optical isolator 10 has an input fiber 101 and an output fiber 102 and is mounted in an isolator tube 19. The output fiber 102 is received in the optical connector 17 to connect the optical isolator 10 to an optical network (not shown). The isolator tube 19 has an external threading 191.

The optical connector 17 can be a common kind of connector, such as an SC type optical connector, an FC type optical connector, an ST type optical connector, or others. The output fiber 102 is received in the optical connector 17, which is coupled to an adaptor 16, and the adaptor 16 has an external threading 161.

The fiber saver 11 comprises a helical block 15, a helical block tube 12, two cone members 13, 14 and an extender 18. The helical block 15 has a helical grove 151 arranged on the surface of the helical block 15, The output fiber 102 is wrapped around the helical block 15 and arranged in the helical grove 151. The radius of the helical block 15 is perfect to ensure the output fiber 102 having a good transmitting performance, and the helical block 15 is received in the helical block tube 12. The two cone members 13, 14 are mounted at the two ends of the helical block tube 12. Each of the cone members 13, 14 has a cone portion 131, 141 and a receiving portion 132, 142. The cone portion 131 is latched by the isolator tube 19 and the cone portion 141 abuts on the optical connector 17 to prevent movement of the helical block 15. The two ends of the helical block tube 12 is received in the receiving portion 132, 142 of the cone members 13, 14, and the input fiber 101 and the output fiber 102 can be loosely received in the cone members 13, 14. The extender 18 has a first inner threading 181 and a second inner threading 182. The first inner threading 181 is coupled with the external threading 191 to connect the isolator tube 19 having the optical isolator 10 received therein to the extender 18, and the second inner threading 182 is coupled with the external threading 161 of the adaptor 16 to connect the optical connector 17 received in the adaptor 16 to the extender 18. Additionally, the extender 18 defines a cavity 183 for accommodating the helical block tube 12 having the helical block 15 received therein.

In assembly, the optical isolator 10 is mounted in the isolator tube 19, and the output fiber 102 is wrapped around the helical block 15. The helical block tube 12 is used to receive and protect the helical block 15. The two cone members 13, 14 are mounted at the two ends of the helical block tube 12 to fix the helical block 15 in the helical block tube 12. The extender 18 is coupled with the isolator tube 19 and the adaptor 16 through the first inner threading 181 and the second inner threading 182 respectively. The output fiber 102 is received in the optical connector 17, which couples to the adaptor 16.

In use, the output fiber 102 of the optical isolator 10 is received in the optical connector 17, connecting the optical isolator 10 to the network via the optical connector 17. If the optical connector 17 is damaged during assembly, or has substandard optical performance due to bad polishing or other causes, the user can disconnect the optical connector 17 from the optical fiber connector assembly 2 and throw the optical connector 17 away. Then, a portion of the output fiber 102 wrapped around the helical block 15 can be unwound from the helical block 15 and can be connected to a new optical connector 17. The total length of the section of the output fiber 102 wrapped around the helical block 15 is long enough to allow a user to replace an optical connector 17 with a new optical connector 17 more than one time, and the optical isolator 10 can, therefore, be reused. Because the optical isolator 10 is an expensive optical component, the reuse of the isolator 10 can obviously save much money.

It is evident that other type of optical component can be used to take the place of the optical isolator 10, such as an optical switch, an optical circulator, an optical attenuator and so on.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber connector assembly, comprising:
    an optical component having at least one port for connecting in an optical network;
    a saver for storing an optical fiber therein; and
    an optical connector coupled to the saver, the length of the stored optical fiber being long enough to allow reconnection of the optical fiber connector assembly to a new optical connector at least once;
    wherein the saver includes a helical block having a helical groove arranged on the surface of the helical block, and the optical fiber is wrapped around the helical block and arranged in the helical groove.

2. The optical fiber connector assembly as claimed in claim 1, wherein the optical component is received in a tube.

3. The optical fiber connector assembly as claimed in claim 1, wherein the saver includes a helical block tube and two cone members, the two ends of the helical block tube being received in the two cone members.

4. The optical fiber connector assembly as claimed in claim 3, wherein the saver further includes an extender for receiving the helical block tube.

5. An optical fiber connector assembly, comprising:
    an optical fiber,
    a saver for storing optical fiber therein; and
    an optical connector coupled to the saver, the length of the stored optical fiber being long enough to allow reconnection of the optical fiber connector assembly to a new optical connector at least once;
    wherein the saver includes a elongated block having a groove arranged on the surface of the elongated block, and the optical fiber is wrapped around the block and arranged in the groove.

6. The optical fiber connector assembly as claimed in claim 5, wherein the groove is helical.

7. The optical fiber connector assembly as claimed in claim 6, wherein the saver includes a block tube and two cone members, and the two ends of the block tube received in the two cone members.

8. The optical fiber connector assembly as claimed in claim 5, wherein said optical fiber defines two opposite ends, of which one is connected to the connector, and the other is connected to an optical component, and said optical connector and said optical component are pre-assembled as one piece during normal use.

9. The optical fiber connector assembly as claimed in claim 8, wherein said saver provides no electrical or optical function.

10. An optical fiber connector assembly, comprising:
    an adaptor for connecting to an optical connector;
    a saver comprising a helical block and a helical block tube;
    an extender coupling to the optical adaptor and receiving the saver; and
    an optical fiber wrapped around the helical block;
    wherein the optical fiber passes through the adaptor for optical coupling with the optical connector.

11. The optical fiber connector assembly as claimed in claim 10, wherein the helical block has a helical groove arranged on the surface of the helical block, and the optical fiber is wrapped around the helical block and arranged in the helical groove.

12. The optical fiber connector assembly as claimed in claim 11, wherein the saver includes two cone members, and the two ends of the helical block tube are received in the two cone members.

* * * * *